United States Patent
Anzalone et al.

[19]

[11] Patent Number: 5,660,243
[45] Date of Patent: Aug. 26, 1997

[54] AIR FLOW, ATMOSPHERIC PARTICLE, AND ENVIRONMENTAL ELEMENT DIVERTER SYSTEM

[75] Inventors: Frank J. Anzalone, Canton; Jeff D. Bartley, Rocherster Hills, both of Mich.

[73] Assignee: Chrysler Corporation, Auburn Hills, Mich.

[21] Appl. No.: 387,650

[22] Filed: Feb. 13, 1995

[51] Int. Cl.⁶ .................................................. B60K 13/02
[52] U.S. Cl. ..................... 180/68.1; 180/68.3; 180/69.25
[58] Field of Search ......................... 180/68.1, 68.2, 180/68.3, 68.6, 69.2, 69.21, 69.24, 69.25

[56] References Cited

U.S. PATENT DOCUMENTS

| | | | |
|---|---|---|---|
| 3,616,871 | 11/1971 | West | 180/68.1 |
| 4,327,680 | 5/1982 | Dauwalder | 123/195 |
| 4,440,555 | 4/1984 | Chichester | 55/385 |
| 4,548,166 | 10/1985 | Gest | 123/52 |
| 4,646,864 | 3/1987 | Racchi | 180/69.25 |
| 4,778,029 | 10/1988 | Thornburgh | 181/229 |
| 4,952,180 | 8/1990 | Watanabe et al. | 440/77 |
| 4,969,939 | 11/1990 | Machad | 55/419 |
| 5,022,479 | 6/1991 | Kiser et al. | 180/69.25 |
| 5,024,687 | 6/1991 | Waller | 55/316 |
| 5,046,976 | 9/1991 | Kobayashi et al. | 440/77 |
| 5,069,644 | 12/1991 | Kobayashi et al. | 440/77 |
| 5,083,538 | 1/1992 | Hubbell | 123/198 |
| 5,129,473 | 7/1992 | Boyer | 180/68.1 |
| 5,152,365 | 10/1992 | Aoshima | 180/68.3 |
| 5,174,258 | 12/1992 | Tanaka | 123/198 |
| 5,181,870 | 1/1993 | Arai et al. | 440/77 |
| 5,340,344 | 8/1994 | Mineo et al. | 440/88 |
| 5,564,513 | 10/1996 | Wible et al. | 180/68.3 |

FOREIGN PATENT DOCUMENTS

| | | | |
|---|---|---|---|
| 0 419 313 A1 | 3/1991 | European Pat. Off. | 180/68.3 |
| 2 667 549 A1 | 4/1992 | France | 180/68.1 |
| 2 227 215 | 7/1990 | United Kingdom | 180/68.1 |

*Primary Examiner*—Richard M. Camby
*Assistant Examiner*—Frank Vanaman
*Attorney, Agent, or Firm*—Thomas G. Pasternak

[57] ABSTRACT

An air flow, atmospheric particle, and environmental element diverter system for supplying air to a vehicle engine compartment, the vehicle having an engine, a radiator, a forced air opening disposed in the front portion of the vehicle, the forced air opening receiving air flow including atmospheric particles and environmental elements. The engine air induction system has fresh air duct having an air inlet port for receiving air flow for the engine, the engine and fresh air duct being disposed in the engine compartment. The air flow, atmospheric particle, and environmental diverter system improvement using an enclosure means forming a duct for conducting a flow of air, and diverting atmospheric particles, and environmental elements laterally to the side of and to the rear of the air inlet port of the engine's fresh air duct. The enclosure means discharges and circulates cool air within the engine compartment while prohibiting direct introduction of air, atmospheric particles, and environmental elements into the air inlet port of the fresh air duct.

7 Claims, 2 Drawing Sheets

AIR FLOW, ATMOSPHERIC PARTICLE, AND ENVIRONMENTAL ELEMENT DIVERTER SYSTEM

BACKGROUND OF THE INVENTION

1. Field of the Invention

The present invention relates, generally, to the art of engine air induction systems. In particular, the present invention relates to an air flow, atmospheric particle and environmental element diverter for combustion engines having a fresh air inlet disposed within the engine compartment.

2. Description of the Related Art

The public at large desires to operate vehicles having a large interior, capable of seating many passengers comfortably. In addition, public demands and government regulations continuously seek increased fuel economy without a degradation in vehicle performance or riding comfort. Since vehicle size and weight are directly related to fuel economy, manufacturers are faced with the competing concerns of providing a spacious vehicle interior while still maintaining acceptable levels of public desirability and government standards of fuel economy. This has led vehicle manufactures to increase the passenger compartment and decrease the space available for the engine; commonly referred to in the art as "cab-forward" design.

By decreasing the volume of the engine compartment, engine components have less space to function. This is especially true for the elongated conduit required for an engine's air induction system. To lessen the complexity of the air induction system in "cab-forward" vehicles, manufactures use engine air induction systems that draw air from the vehicle under-hood environment. This is usually accomplished by having the inlet port of the fresh air duct placed on top and to the front of the engine for receiving an mount of air directly from the vehicle front air opening. Vehicles that are not "cab-forward" designed typically employ the use of elongated air ducts stretching in close proximity to the vehicle's forced air opening. This allows air to be drawn directly from the outside atmospheric air rather from the under-hood environment. This design, however, allows atmospheric particles and other environmental elements such as bugs or stones to be ingested directly into the vehicle's fresh air duct.

As described, under-hood engine induction systems draw air from the engine compartment. In particular, the air enters the vehicle compartment through an opening located towards the front of the vehicle. The air then passes through the vehicle radiator and into the engine compartment. The opening at the front of the vehicle is commonly referred to as the forced air opening. The heat dissipated by the radiator heats the atmospheric air being introduced into the engine compartment. In addition, the under-hood air is heated by high output engines that run at relatively high revolutions per minute. Additional factors causing high temperatures in the engine compartment are: compact under-hood packaging, and increasingly smaller front end air openings that are used to decrease vehicle wind resistance. The warmer the air introduced into the air induction system becomes, the higher the engine charging temperature. A high charging temperature will commonly result in a degradation of engine performance and a loss in engine horse power.

A further problem with under-hood air induction systems is that they require placement of the air inlet port of the fresh air duct, above and to the front of the engine. In this location, the inlet port is exposed to atmospheric particles such as dust, ice, snow, and moisture particles introduced into the under-hood environment via the vehicle front opening. These particles and other environmental elements, such as bugs or stones, may then be drawn into the air induction system. As a result, the engine air filter may become clogged and air flow may be restricted. This may produce significant vacuum levels in the engine crank case that, in turn, may damage engine seals and oil may be lost. High air flow restriction may also cause a reduction in engine performance. To remedy this anomaly, prior air reduction systems have used a fine mesh filter disposed between the air opening and air induction system to collect atmospheric particles. Yet, nothing is provided to divert air over the warm radiator to decrease charging temperature. Moreover, the filter may become clogged with atmospheric particles and degrade engine performance. In addition, "cab-forward" designed vehicles make it difficult for service technicians to work on the engine because of cramped engine compartments.

It is therefore desirable in the art of engine air induction systems to have an air induction system that introduces cool outside air into the under-hood environment, redirects harmful radiator air flow, atmospheric particles, and environmental elements away from the inlet of the engine's air induction system, and is easily moveable out of the engine compartment when the engine is being serviced.

SUMMARY OF THE INVENTION

The present invention provides an air flow, atmospheric particle, and environmental element diverter system for a vehicle, the vehicle having an engine, a radiator, a forced air opening located at the forward end of the vehicle, the forced air opening receiving air flow, atmospheric particles, and environmental elements as the vehicle moves in a forward direction, an air induction system having an air inlet port for receiving air flow for the engine, and an engine compartment including a hood covering, the engine and air induction system being within the engine compartment. The air flow, atmospheric particle, and environmental element diverter system improvement comprising an air flow enclosure in communication with the forced air opening and in bypass relation to the radiator. The diverter discharges air in bypass relationship to the air inlet port of the fresh air duct. The air flow enclosure causes cool air to circulate within the engine compartment and prohibits atmospheric particle, and environmental element introduction into the air inlet port of the fresh air duct.

An advantage of the present invention is that an air source is provided that diverts outside air past the radiator thereby providing the circulation of cool, ambient air within the engine compartment.

A further advantage of the present invention is that an air source is provided to divert atmospheric particles and environmental elements such as small bugs and stones away from the inlet port of the fresh air duct.

Another advantage of the present invention is the provision for an air source that moves with the opening of the hood so that work can be performed by a service technician on the engine given compact under-hood packaging.

A still further advantage is that an air source is provided that lowers engine charging temperature thereby increasing engine performance.

Other objects, features and advantages of the present invention will become apparent by reference to the following detailed description when considered in conjunction with the accompanying drawings.

DESCRIPTION OF THE DRAWINGS

In the description of the drawings below, reference characters refer to like parts throughout the views, and wherein.

DESCRIPTION OF THE PREFERRED EMBODIMENT(S)

Figure 1:
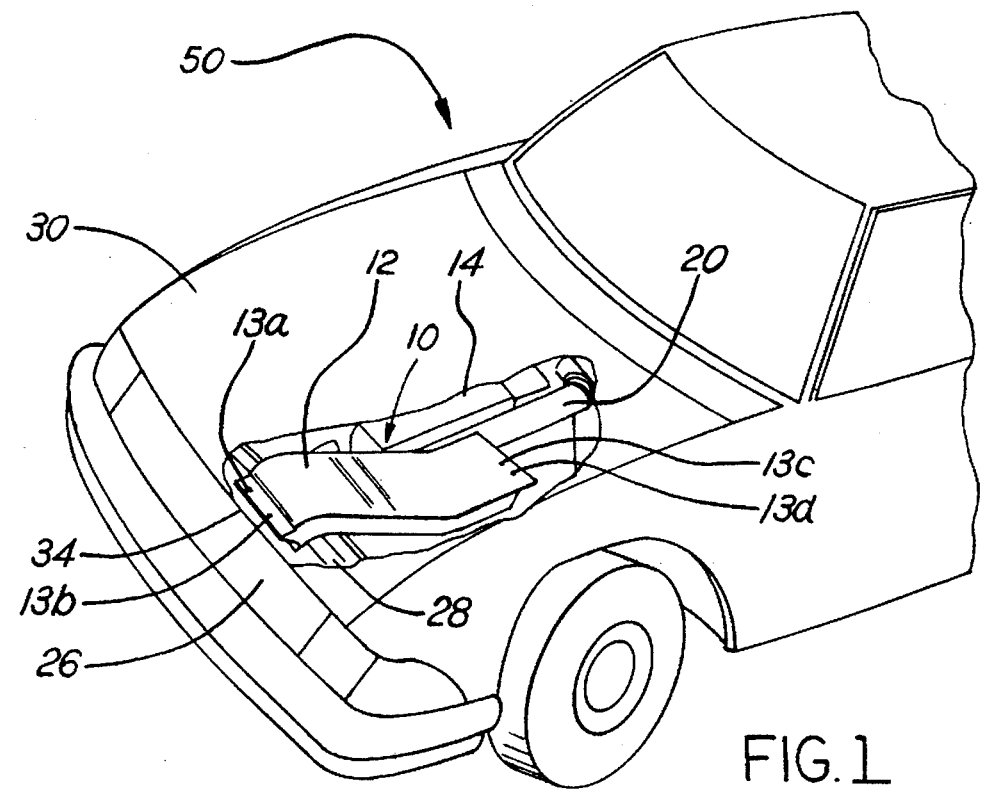
FIG. 1 is a perspective view of a front end portion of a vehicle with portions of the hood cut-away to show the air flow and atmospheric particle diversion system of the present invention.
Figure 2:
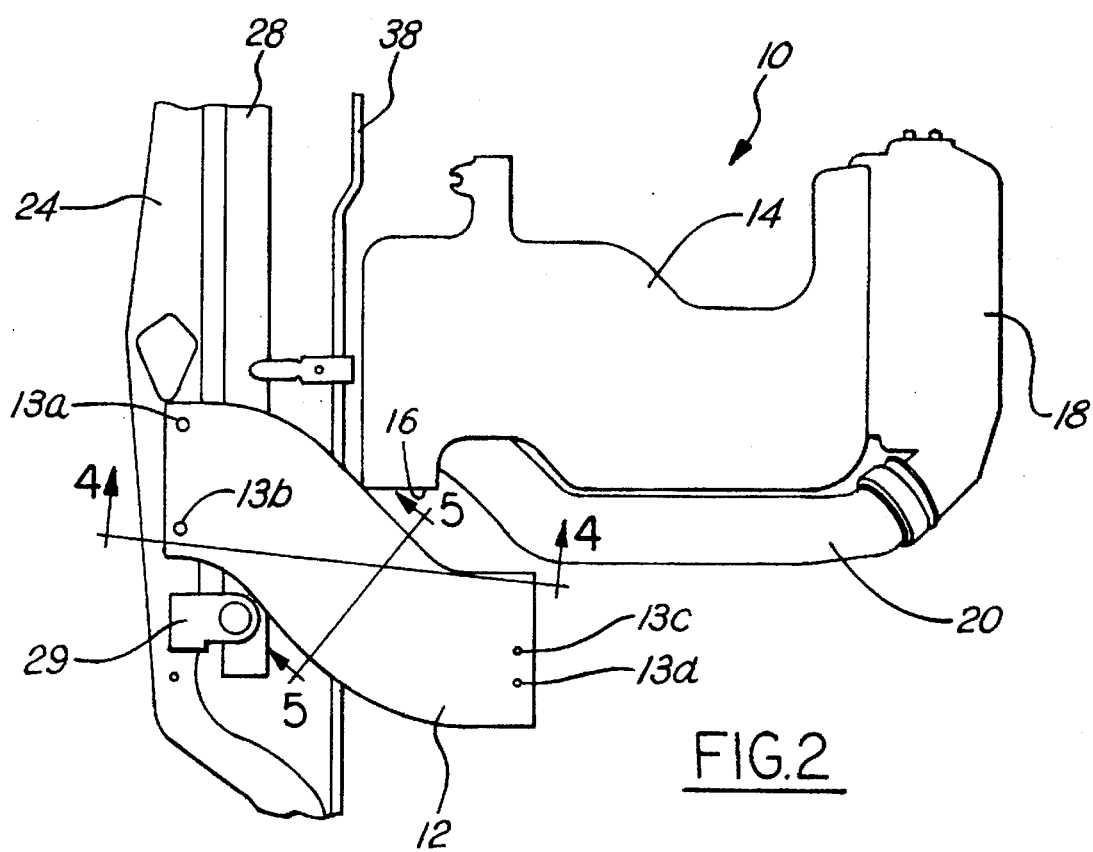
FIG. 2 is a top plan view of the air flow and atmospheric particle diversion system of the present invention.
Figure 3:
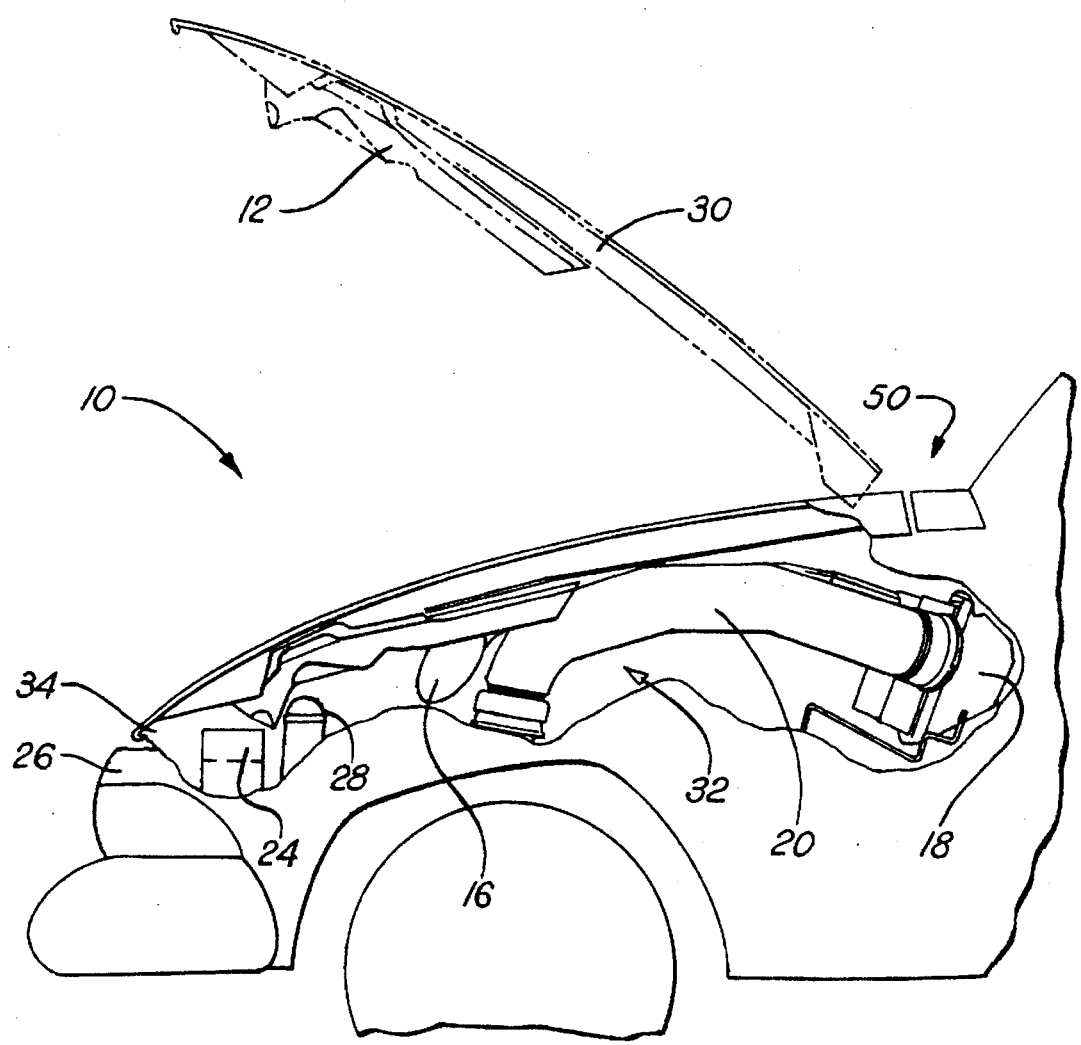
FIG. 3 is a side elevational view of a front end portion of a vehicle with portions cut-away to show the air flow and atmospheric particle diversion system of the present invention with the vehicle hood in a closed position and denoted in a open position with broken lines.

Commencing with FIG. 1, a vehicle 50 is shown having the subject air flow, atmospheric particle, and environmental element diverter system 10 disposed under the hood 30. As shown in FIG. 2, the vehicle 50 includes a frame member 24, which may be of any known type construction for light weight and high strength. The frame member 24 extends across the forward end portion of an engine compartment 32, best shown in FIG. 3, that includes a hood 30 and wherein an engine (not shown) is disposed. The hood 30 is rotatably moveable. The forward end of the hood 30 is adjacent to the vehicle frame member 24 when in a closed position and spaced from the frame member 24 when in an open position. The vehicle 50 further includes a front end portion 26. A forced air opening 34 is formed beneath the hood 30 for receiving a flow of air and associated atmospheric particles. It is expressly understood that the forced air opening 34 can be formed anywhere in the vehicle's front end portion 26, hood 30, or partially formed in each. It is also understood that while FIGS. 1 and 3 show a car like vehicle, the air flow and atmospheric particle diverter system is equally useful in a truck or sport like utility vehicle.

Figure 4:
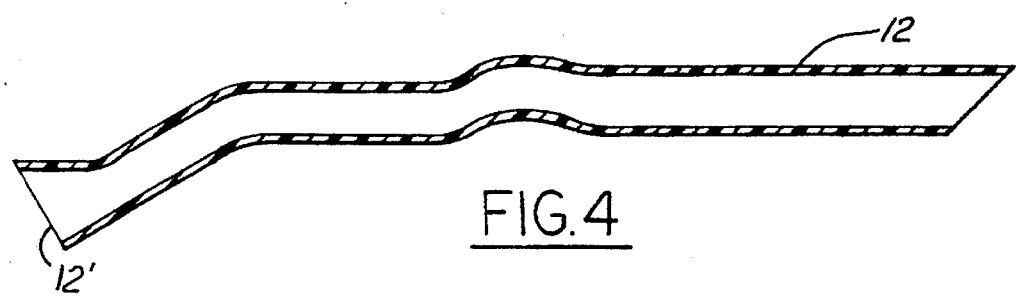
FIG. 4 is a cross sectional view of the diverter of the present invention taken along line 4—4 of FIG. 2.
Figure 5:
FIG. 5 is a cross sectional view of the diverter of the present invention taken along line 5—5 of FIG. 2.

As shown in FIG. 4, the particle diverter system 10 includes a diverter 12 with an inlet 12' for receiving a flow of air, atmospheric particles, and other environmental elements. Although, the diverter 12 can be any open ended hollow shape, in the present embodiment the diverter 12 is an S shaped, open ended, hollow housing as shown in FIGS. 4 and 5. To lower charging temperature of the engine and thus increase engine performance, the atmospheric air is routed over and in bypass relation to a radiator 28. In the preferred embodiment, the diverter 12 is placed above the radiator 12 in the engine compartment 32, as shown in FIG. 2, so that atmospheric air flowing therein bypasses the radiator 12.

The diverter 12 is fastened to hood 30 via fasteners inserted through diverter fastening apertures 13.a, 13.b, 13.c, and 13.d, as shown in FIG. 2. It is appreciated in the art that many fastening means could be employed to fasten the diverter 12 to the hood 30. An exemplary list may include hook and loop fasteners, screws, welding joints, rivets, or glue type bonding. Having the diverter 12 attached to the hood 30 moves it away from the engine compartment 32 when work is being performed by a service technician.

Shown in FIG. 2, and associated with the diverter system 10 is a fresh air duct 14 for the engine. As shown in FIGS. 2 and 3, duct 14 has an open first end forming an inlet port 16 for receiving air. The fresh air duct 14 extends from inlet port 16 longitudinally through the engine compartment 32 and terminates at a second end attached to an air cleaner 18, as shown in FIG. 2. The air cleaner 18 typically houses an air filter (not shown) for filtering atmospheric particles and environmental elements from the air. The air cleaner 18 is attached to a clean air hose 20 that extends longitudinally through the engine compartment 32 and is attached to the engine's throttle body (not shown).

The functional operation of the air flow, atmospheric particle, and environmental element diverter system 10 is as follows. When the vehicle 50 is in motion, air passes through the forced air opening 34. Part of the air flows through the radiator 28 and part flows into inlet 12' of the diverter 12. The diverter 12 receives the flow of air, atmospheric particles, and environmental elements from outside the vehicle 50 and directs them to a location within the engine compartment 32 spaced laterally away from and to the rear of the inlet port 16 of fresh air duct 14. This inhibits entry of dust, ice, snow, and rain atmospheric particles from entering the air duct inlet port 16 of fresh air duct 14. Moreover, environmental elements such as bugs or stones are also kept from entering the air duct inlet port 16 since they are directed rearwardly in the engine compartment 32 where engine componentry will not be affected and the particles merely fall to the ground.

Furthermore, since air flowing through the diverter 12 does not pass through the radiator 28, the air therefrom is relatively cool and lowers the temperature of the engine compartment 32. After the air is discharged into engine compartment 32, and away from fresh air duct 14, it circulates within the engine compartment 32 and then may enter the inlet 16 of fresh air duct 14. After entering inlet 16, air then travels through the length of the fresh air duct 14 to the air cleaner 18. The air is then filtered and travels through clean air hose 20 to the engine throttle body.

While the invention has been described in detail, it is to be expressly understood that it will be apparent to persons skilled in the relevant art that the invention may be modified without departing from the spirit of the invention. Various changes of form, design or arrangement may be made to the invention without departing from the spirit and scope of the invention. Therefore, the above mentioned description is to be considered exemplary, rather than limiting, and the true scope of the invention is that defined in the following claims.

What is claimed is:

1. An air flow, atmospheric particle, and environmental element diverter system for passing air into an engine compartment of a vehicle having a front end portion, an engine, a hood, and an engine compartment, the vehicle having a forced air opening disposed in the front end portion of the vehicle for receiving air flow, atmospheric particles, and environmental elements, a radiator, a fresh air duct in the engine compartment having an air inlet port with two side portions and a rear portion for receiving air flow into the engine, the air flow, atmospheric particle, and environmental diverter system improvement comprising:

enclosure means for conducting a flow of air into the engine compartment and diverting atmospheric particles, and environmental elements in bypass relation to the air inlet port of the fresh air duct by discharging the flow laterally to the side of one of said side portions, and behind said rear portion of the air inlet port, whereby the enclosure means provides and circulates cool air within the engine compartment while prohibiting direct introduction of air flow, atmospheric particles, and environmental elements into the air inlet port of the fresh air duct, wherein the enclosure means comprises an S-shaped, open-ended hollow housing, and wherein the enclosure means is placed above the radiator in the engine compartment.

2. The environmental element diverters system of claim 1 wherein the forced air opening is formed in the vehicle beneath the hood.

3. The system of claim 1 wherein the forced air opening is formed at least in part by the hood.

4. An air flow, atmospheric particle, and environmental element diverter system for passing air into an engine compartment of a vehicle having a first end portion, an engine, a hood, and an engine compartment, the vehicle having a forced air opening disposed in the first end portion of the vehicle for receiving air flow, atmospheric particles, and environmental elements, a radiator, and a fresh air duct in the engine compartment having an air inlet port within the engine compartment for receiving air flow into the engine, the air flow, atmospheric particle, and environmental diverter system improvement comprising:

enclosure means forming an air flow duct into the engine compartment disposed above the radiator and in bypass relation to the air inlet port having two side portions and a rear portion of the fresh air duct, for conducting a flow of air and for diverting atmospheric particles, and environmental elements laterally to the side of one of said side portions and to the rear of said rear portion of the air inlet port, the enclosure means causing circulation of cool air within the engine compartment while prohibiting direct introduction of air flow, atmospheric particles, and environmental elements into the air inlet port of the fresh air duct, wherein the enclosure means comprises an S shaped, open ended, hollow housing, and wherein the forced air opening is formed in the vehicle at a point below the hood.

5. The system of claim 4 wherein the forced air opening is formed at least in part by the hood.

6. An air flow, atmospheric particle, and environmental element diverter system for passing air into an engine compartment of a vehicle having a front end portion, an engine, an engine compartment, and a hood having an underside, the vehicle having a forced air opening disposed in the front end portion of the vehicle for receiving air flow, atmospheric particles, and environmental elements, a radiator, and a fresh air duct in the engine compartment having an air inlet port with two side portions and a rear portion for receiving air flow into the engine, and a hood covering the engine compartment, the air flow, atmospheric particle, and environmental element diverter system improvement comprising:

an S shaped, open ended, hollow housing disposed above the radiator and in the engine compartment for conducting a flow of air and diverting atmospheric particles, and environmental elements laterally to the side of one side portion of and to the rear of the rear portion of the air inlet port in bypass relation to the air inlet port of the fresh air duct, the enclosure means discharging and circulating cool air within the engine compartment while prohibiting direct introduction of atmospheric particles, and environmental elements into the air inlet port of the fresh air duct, the S shaped, open ended, hollow housing being attached to the underside of the hood so that when the hood is raised to an open position the housing moves therewith away from the engine compartment.

7. The system of claim 6 wherein said housing is integral with the underside of said hood.

* * * * *